United States Patent
Kuo et al.

(10) Patent No.: US 10,850,591 B2
(45) Date of Patent: Dec. 1, 2020

(54) APPARATUS AND SYSTEM FOR AIR CONDITIONING OUTPUT MEASUREMENT AND COOLANT SERVICING

(71) Applicant: Pacific Link L.L.C., Richardson, TX (US)

(72) Inventors: Alexander Kuo, Dallas, TX (US); James H. Monti, Plano, TX (US)

(73) Assignee: PACIFIC LINK, L.L.C., Richardson, TX (US)

( * ) Notice: Subject to any disclaimer, the term of this patent is extended or adjusted under 35 U.S.C. 154(b) by 344 days.

(21) Appl. No.: 15/948,723

(22) Filed: Apr. 9, 2018

(65) Prior Publication Data
US 2019/0168572 A1   Jun. 6, 2019

Related U.S. Application Data

(63) Continuation-in-part of application No. 15/045,242, filed on Feb. 16, 2016, now Pat. No. 9,981,637.

(51) Int. Cl.
*G01K 13/00* (2006.01)
*B60H 1/00* (2006.01)
(Continued)

(52) U.S. Cl.
CPC ..... *B60H 1/00585* (2013.01); *B60H 1/00985* (2013.01); *G01K 1/024* (2013.01);
(Continued)

(58) Field of Classification Search
CPC ............ G01K 13/02; G01K 7/42; G01K 1/08; G01K 1/12; G01K 13/00; G01N 27/4067;
(Continued)

(56) References Cited

U.S. PATENT DOCUMENTS 1,595,521 A * 8/1926 Meyer .................... B60R 17/00
                                                    137/355
2,170,173 A * 8/1939 Wheatley ................. B67D 3/00
                                                    222/158
(Continued)

FOREIGN PATENT DOCUMENTS

GB          1273660 A * 5/1972 ........... B65D 17/503

OTHER PUBLICATIONS

International Search Report and Written Opinion for International Application No. PCT/US2019/026679, dated Jul. 1, 2019, 10 Pages.

*Primary Examiner* — Gail Kaplan Verbitsky
(74) *Attorney, Agent, or Firm* — Leber IP Law; David C. Robertson (57) ABSTRACT

An apparatus and method for measuring air conditioning output temperature to ensure the proper amount of refrigerant for refilling or servicing a coolant system, such as an automobile coolant system, are disclosed. In one embodiment, the apparatus includes a measurement display for viewing the temperature of air conditioning output inside a vehicle while the user is outside the vehicle refilling or servicing a coolant system. The measurement display is in communications with a temperature sensor measuring the air temperature at a vent inside the vehicle to allow a user to ensure the proper amount of coolant is refilled.

14 Claims, 7 Drawing Sheets

(51) Int. Cl.
  *G01K 13/02* (2006.01)
  *G01K 1/14* (2006.01)
  *G01K 1/02* (2006.01)
  *B60H 1/32* (2006.01)

(52) U.S. Cl.
  CPC .............. *G01K 1/028* (2013.01); *G01K 1/14* (2013.01); *G01K 13/02* (2013.01); *B60H 2001/3261* (2013.01); *G01K 2013/024* (2013.01); *G01K 2201/02* (2013.01)

(58) Field of Classification Search
  CPC ............ G01N 11/00; G01N 2011/0093; B65D 43/02; B65D 43/16; B65D 51/18; B65D 53/02; B65D 1/0246; B65D 41/28; B65D 2543/00972; B65D 51/248; B65D 51/20; B65D 41/0442; B65D 2543/00731; B65D 45/00
  USPC ........ 374/141, 163, 208, 100, 4, 5, 166, 145
  See application file for complete search history.

(56) References Cited

U.S. PATENT DOCUMENTS

| | | | |
|---|---|---|---|
| 2,805,035 A * | 9/1957 | Coombs | B65F 1/141 248/508 |
| 3,010,520 A * | 11/1961 | Seaberg | A62C 13/64 169/77 |
| 3,100,391 A | 8/1963 | Mansfield | |
| 3,635,086 A | 1/1972 | Beruck | |
| 4,282,754 A * | 8/1981 | Provasnik | F02B 77/089 338/22 R |
| 4,337,917 A * | 7/1982 | Tesack | B67D 7/50 141/392 |
| 4,772,132 A | 9/1988 | Hofmann | |
| 4,827,730 A | 5/1989 | Doi et al. | |
| 5,249,963 A * | 10/1993 | McGarrigle | A61C 19/00 206/63.5 |
| 5,295,747 A | 3/1994 | Vinci | |
| 5,324,114 A | 6/1994 | Vinci | |
| 5,367,888 A * | 11/1994 | Muston | B60H 1/00585 62/149 |
| 5,741,069 A | 4/1998 | Egel | |
| 5,762,236 A * | 6/1998 | Foster | B05B 11/3011 222/383.1 |
| 6,000,845 A * | 12/1999 | Tymkewicz | G01K 1/146 374/155 |
| 6,539,988 B1 | 4/2003 | Cowan et al. | |
| 6,675,829 B2 | 1/2004 | Moore et al. | |
| 8,079,226 B2 * | 12/2011 | Brown | B60H 1/00585 62/149 |
| 8,682,526 B2 | 3/2014 | Mola et al. | |
| 9,273,888 B2 * | 3/2016 | McMasters | F25B 45/00 |
| 10,408,515 B2 * | 9/2019 | Bonifaccino | B60H 1/00585 |
| 10,473,529 B2 * | 11/2019 | Bronk | G01K 1/14 |
| 2003/0158704 A1 | 8/2003 | Triginai et al. | |
| 2005/0217285 A1 | 10/2005 | Carrubba et al. | |
| 2005/0262855 A1 * | 12/2005 | Hsieh | F25B 49/005 62/126 |
| 2007/0294005 A1 | 12/2007 | Kerschl | |
| 2008/0216491 A1 | 9/2008 | Quest et al. | |
| 2009/0057313 A1 * | 3/2009 | Alvares | B65D 21/0219 220/254.1 |
| 2009/0113901 A1 * | 5/2009 | Carrubba | B60H 1/00978 62/77 |
| 2011/0137522 A1 | 6/2011 | Mola et al. | |
| 2012/0192576 A1 | 8/2012 | Carrubba | |
| 2013/0142669 A1 * | 6/2013 | Pyle | F01P 7/164 417/12 |
| 2013/0319025 A1 | 12/2013 | Wagaman et al. | |
| 2014/0014860 A1 * | 1/2014 | Cloud | B67D 7/50 251/89 |
| 2014/0197170 A1 * | 7/2014 | Carlile | B65D 47/249 220/262 |
| 2014/0260350 A1 * | 9/2014 | McMasters | F25B 49/02 62/77 |
| 2015/0267950 A1 * | 9/2015 | Lundberg | F25B 43/02 62/85 |
| 2015/0308879 A1 * | 10/2015 | Pistone | F25B 45/00 73/292 |
| 2016/0045056 A1 * | 2/2016 | Kent | H05B 6/804 219/731 |
| 2017/0174042 A1 | 6/2017 | Kuo et al. | |
| 2017/0232940 A1 | 8/2017 | Kuo et al. | |
| 2018/0010832 A1 * | 1/2018 | Bonifaccino | F24F 11/83 |
| 2019/0168572 A1 | 6/2019 | Kuo et al. | |
| 2019/0173277 A1 * | 6/2019 | Kincaid | B62B 5/06 |
| 2019/0382169 A1 * | 12/2019 | Schlegel | F16J 15/062 |

\* cited by examiner

APPARATUS AND SYSTEM FOR AIR CONDITIONING OUTPUT MEASUREMENT AND COOLANT SERVICING

RELATED APPLICATION

The present application is a continuation-in-part of application Ser. No. 15/045,242 filed Feb. 16, 2016 which is incorporated herein by reference in its entirety.

BACKGROUND

The apparatus and method disclosed herein relates to an air conditioning output temperature measurement device for use in refilling or servicing a coolant system, such as an automobile coolant system. The air conditioning output temperature measurement device may be used with a bottle actuator assembly designed to operate in conjunction with a pressurized bottle, such as a refrigerant bottle. Additionally, the apparatus and system allows a non-professional to easily measure the temperature of air output at the air conditioning vent while refilling to ensure that sufficient coolant has been filled.

Typical coolant systems, such as those found in an automobile air conditioner, include three main components—a compressor, a condenser, and an evaporator. A compressor is a pump driven by a belt attached to the engine's crankshaft. Refrigerant is drawn into the compressor in a low-pressure gaseous form. Once inside the compressor, a belt drives the pump pressurizing the gas which thereby gets hot by absorbing the surrounding heat.

Conversely, as the pressure of the gas decreases, the gas temperature decreases. This expansion of the refrigerant gas in a coolant system acts to cool the system containing the refrigerant. Air is then blown over the cooled system into the cabin of the automobile.

In such an air conditioning unit, the ability of cooling provided using the compression and expansion of a gaseous refrigerant will vary depending on the level of refrigerant present in the system. For numerous reasons, refrigerant may slowly leak from the air conditioning system. As such, an automobile air conditioning system may require routine monitoring of the refrigerant level or pressure and periodic refilling the refrigerant.

To allow refilling of the refrigerant, automotive air conditioners are generally provided with a service or coolant port to permit the addition of refrigerant as well as to permit the inspection of the level of refrigerant in the system. Although such refilling and inspection is typically performed by service professionals, a significant number of automobile owners prefer to perform routine maintenance on their own vehicles, in part due to the savings obtained.

One standard tool used by service professionals for refilling refrigerant and measuring pressure or other parameters in automobile air conditioners is a set of manifold gauges. This tool typically includes three hoses and two gauges; wherein one hose connects to a low-pressure service port; one hose connects to a high-pressure service port; and a third hose connects to the source of refrigerant. The gauges are then used to measure the pressure at the service ports. Although manifold gauges may be a standard tool used by service professionals, a number of disadvantages may reduce their popularity among general consumers. These disadvantages include: being complicated to use; requiring the user to know the approximate ambient temperature; requiring a user to look up the pressure readings of the gauges on a chart to determine if there is sufficient refrigerant in the system, requiring a user to know the correct pressure readings for each automobile make and model; presenting a high up-front costs of equipment that is infrequently used. An innovative way for providing a refilling of refrigerant and measuring the pressure of coolant systems using an adaptable bottle actuator assembly capable of interoperating with various forms of pressurized bottles is described in U.S. patent application Ser. No. 14/680,066.

Prior art systems disclose methods and devices for measuring the temperature of the coolant in the engine. However, for most non-professionals, this remains a difficult task. Additionally, measuring temperature of the coolant at the service port is not reliable for all vehicles due to the evolution of air conditioning technologies. Automotive air conditioning systems are ever evolving and changing to reach better efficiencies and improved cooling results. Among these changes are a shift in how coolant is released and used. One such change is a move from the use of a fixed orifice system, whereas the release of coolant from low pressure to high pressure is through a fixed or static hole which results in inefficient cooling, to the use of a thermal expansion system, whereas the release of coolant is dependent upon a dynamic pressure in the system and changes as the system requires. This makes the measurement of pressure of one service port unstable and frequently results in the over filling of coolant requiring the user to release the over filled coolant into the atmosphere causing damage to the environment. Despite the evolving automotive air conditioning technology independent of all parameters is the optimal air conditioning output temperature. Therefore, there is a need to measure the temperature at the vehicle air conditioning vents to ensure that the sufficient coolant has been filled in the coolant system.

The servicing of coolant in automobile air conditioning systems typically first requires the user to start the vehicle engine so that the air conditioner may actively cycle. To fill refrigerant, the user must be outside the vehicle, near the coolant service port, while the engine is running. Leaving the coolant service port to check the air conditioner output temperature inside the vehicle requires the user to either disconnect the refrigerant bottle by reaching a hand/arm into a running engine, which poses a risk of injury to the user, or leave a pressurized coolant bottle connected and place it on top of a running engine, which poses a risk if the bottle falls into the engine damaging the engine or causes bodily injury to the user or others around the user. Therefore, there is a need to measure such the temperature at the vehicle air conditioning vent inside the vehicle while the user remains at the vehicle coolant port outside the vehicle to continuously determine the sufficiency of the refrigerant added to the coolant system while maintaining control of the pressurized bottle of coolant.

Various apparatus and system embodiments of the present invention may be used that are adaptable to a bottle actuator assembly for use with various pressurized bottles. Embodiments of the present invention allow a consumer to determine the sufficiency of the refrigerant level in an automobile air conditioner, and to add refrigerant as needed. Additional advantages of embodiments of the invention are set forth, in part, in the description which follows and, in part, will be apparent to one of ordinary skill in the art from the description and/or from the practice of the invention.

SUMMARY OF THE INVENTION

An apparatus and method for measuring the proper amount of coolant for refilling or servicing a coolant system, such as an automobile coolant system, are disclosed. The invention provides a device for measuring the temperature of the air output at an air conditioning vent inside the vehicle to ensure the proper amount of coolant is refilled while the user is refilling refrigerant for a coolant system from outside the vehicle. A display is preferably disposed within a housing for operation with a bottle actuator assembly for a pressurized bottle. The display is in communication with a temperature sensor placed at or near the air conditioner vent inside the vehicle.

In another aspect, the temperature sensor is connected to the display via an electrical wire. The display housing preferably includes a recessed portion for storage of the electrical wire and temperature sensor.

In another aspect, the temperature sensor is connected to the display via a wireless connectivity.

In another aspect, the temperature sensor comprises a thermocouple thermometer.

In another aspect, the coolant temperature measurement device includes a second temperature sensor which measures the ambient temperature, thereby providing an indication that the vehicle coolant system has been filled with sufficient refrigerant based on the temperature at the air conditioning vent inside the vehicle relative to the ambient temperature.

DETAILED DESCRIPTION

While the inventions disclosed herein are susceptible to various modifications and alternative forms, specific embodiments are shown by way of examples in the drawings and described in detail. It should be understood that the figures and detailed description discussed herein are not intended to limit the invention to the particular forms disclosed. On the contrary, the intention is to cover all modifications, equivalents and alternatives falling within the spirit and scope of the present inventions as defined by the appended claims. Description will now be given of the invention with reference to FIGS. 1-7.

Figure 1:
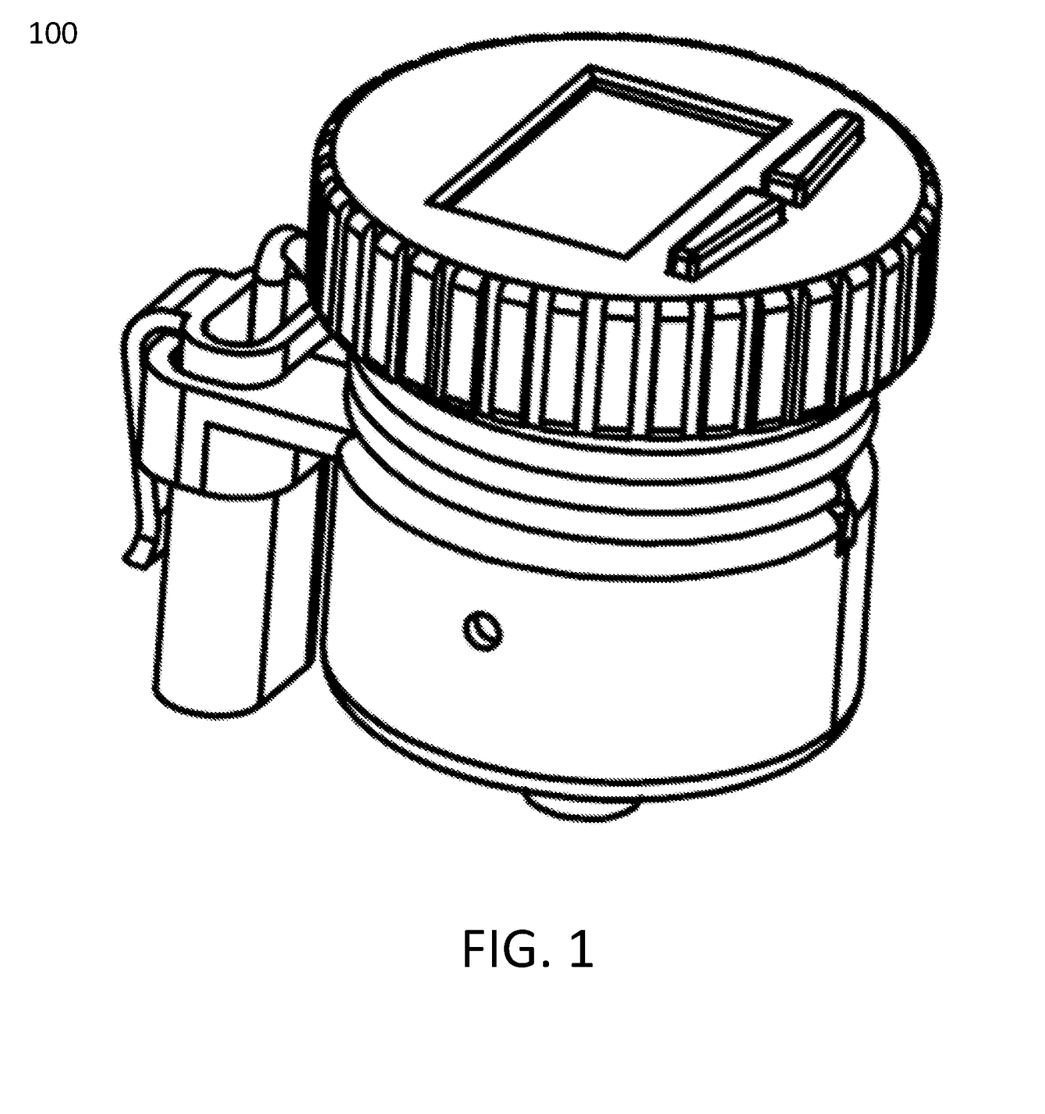
FIG. 1 is a perspective view of an exemplary air conditioning output temperature measurement device in accordance with the invention.
Figure 2:
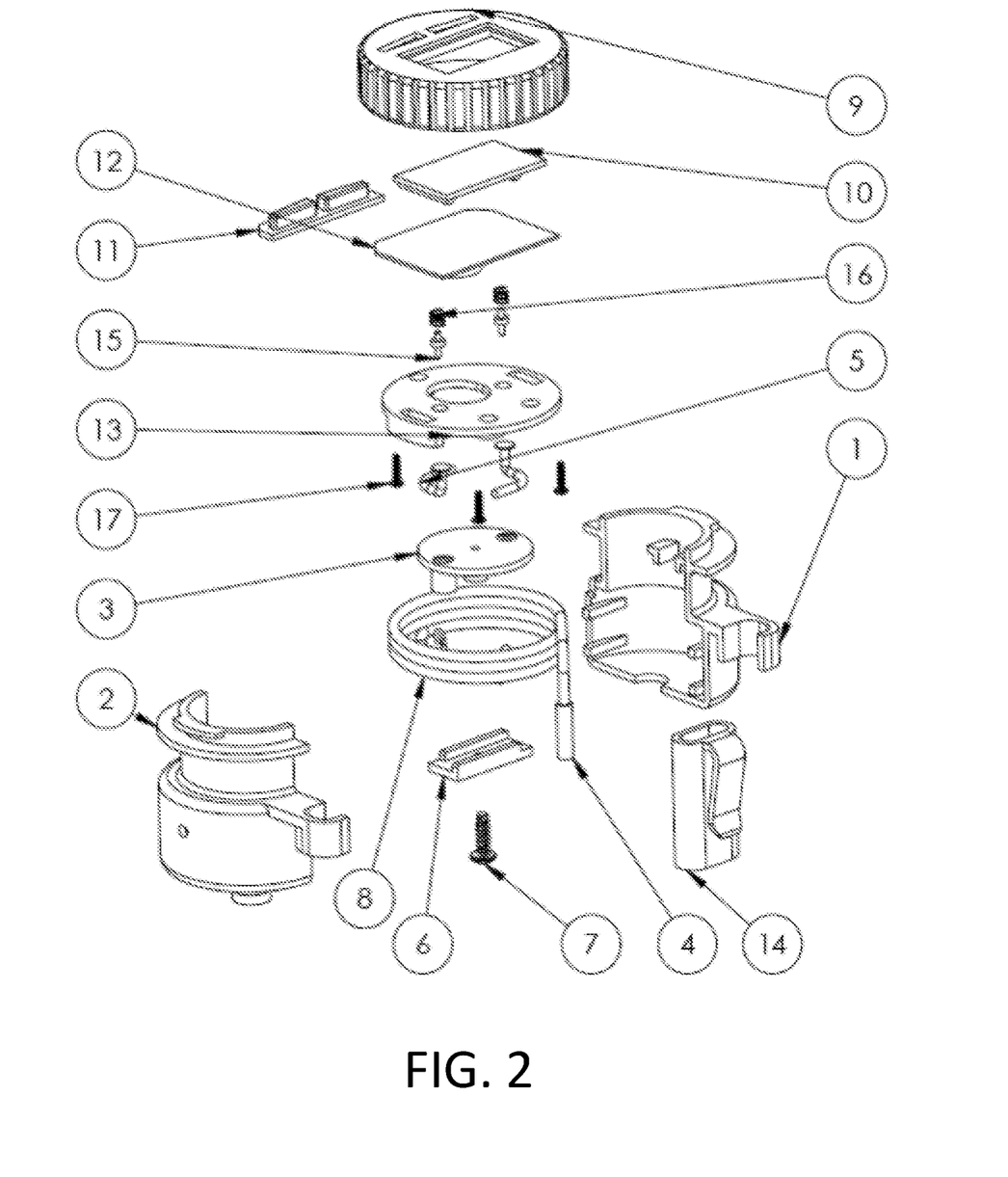
FIG. 2 is a perspective view of the individual components of an exemplary air conditioning output temperature measurement device in accordance with the invention.

As shown generally in FIGS. 1 and 2, the inventive air conditioning output temperature measurement device 100 operable with a bottle assembly for use with pressurized coolant bottles and puncture top bottles preferably includes a number of easily manufactured and assembled components. In an exemplary embodiment, the air conditioning output temperature measurement device housing may be composed of two easily fabricated cup halves 1, 2. In the exemplary embodiment, a digital display in operation with a digital temperature sensor is disclosed, however any temperature sensor may be substituted. For example, the temperature sensor 4 may be a thermocouple thermometer and may be interchangeable to operate with the temperature measurement device. The exemplary embodiment includes a display cap 9, a display 10, buttons 11, printed circuit board (pcb) 12, pcb retainer 13, contact frame 3, contact 5, clamp 6, and various screws, pins and springs 7, 15, 16, 17 to fix the components in the cup halves 1, 2.

In the exemplary embodiment, the air conditioning output temperature measurement device also includes a temperature sensor 4 in electrical communication via a wire 8. The temperature sensor 4 is housed in a clip 14 for attachment to an air conditioner vent. A temperature sensor in accordance with the invention may also communicate with the coolant temperature measurement device by other means, including adapted to communicate wirelessly without departing from the spirt of the invention.

As shown in FIG. 2, the exemplary air conditioning output temperature measurement device is preferably constructed from a number of easily replicable and interchangeable components.

Figure 3:
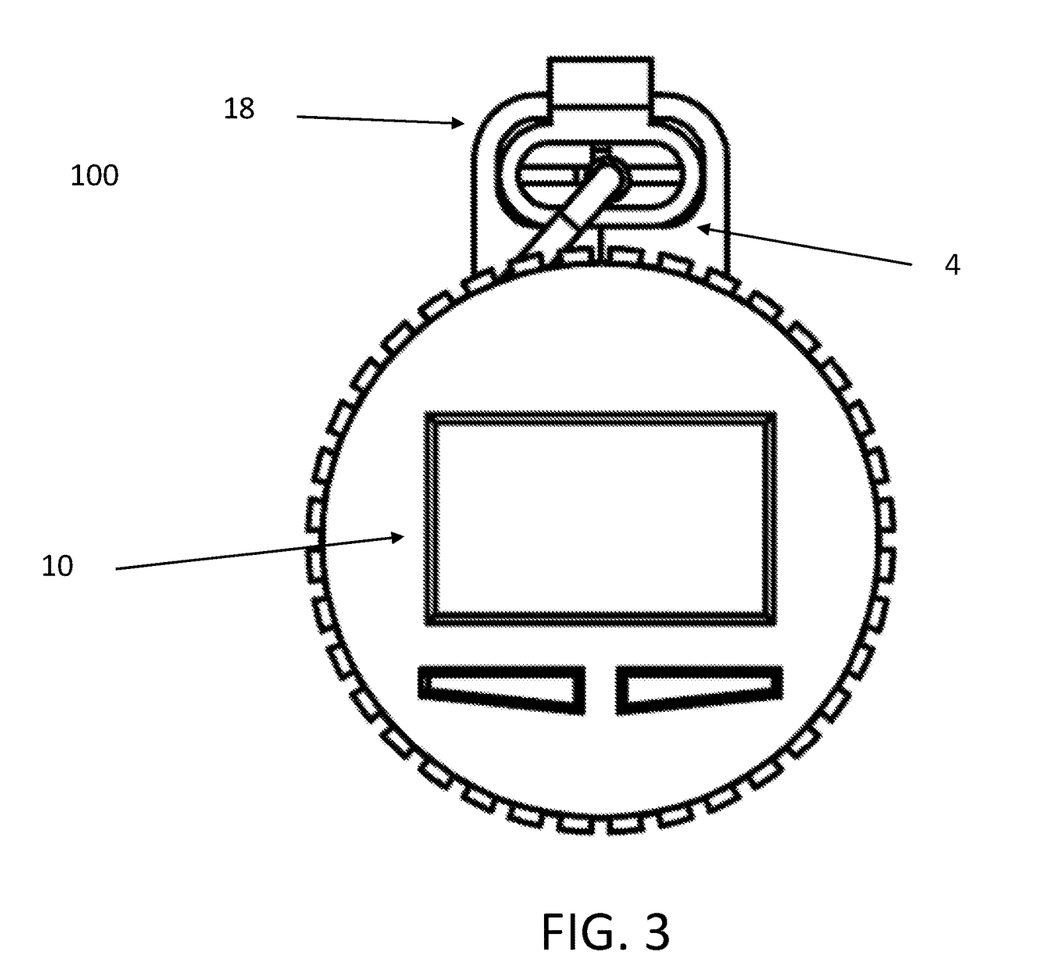
FIG. 3 is a top perspective view of an exemplary air conditioning output temperature measurement device in accordance with the invention

As show in the top view of FIG. 3, the exemplary air conditioning output temperature measurement device 100 includes a display 10. Display 10 is preferable a digital display for ease of reading by a user. However, as discussed above an analog display may be substituted as well. The housing halves 1, 2 includes a holder 18 for storing the temperature sensor 4 and vent clip 14.

Figure 4:
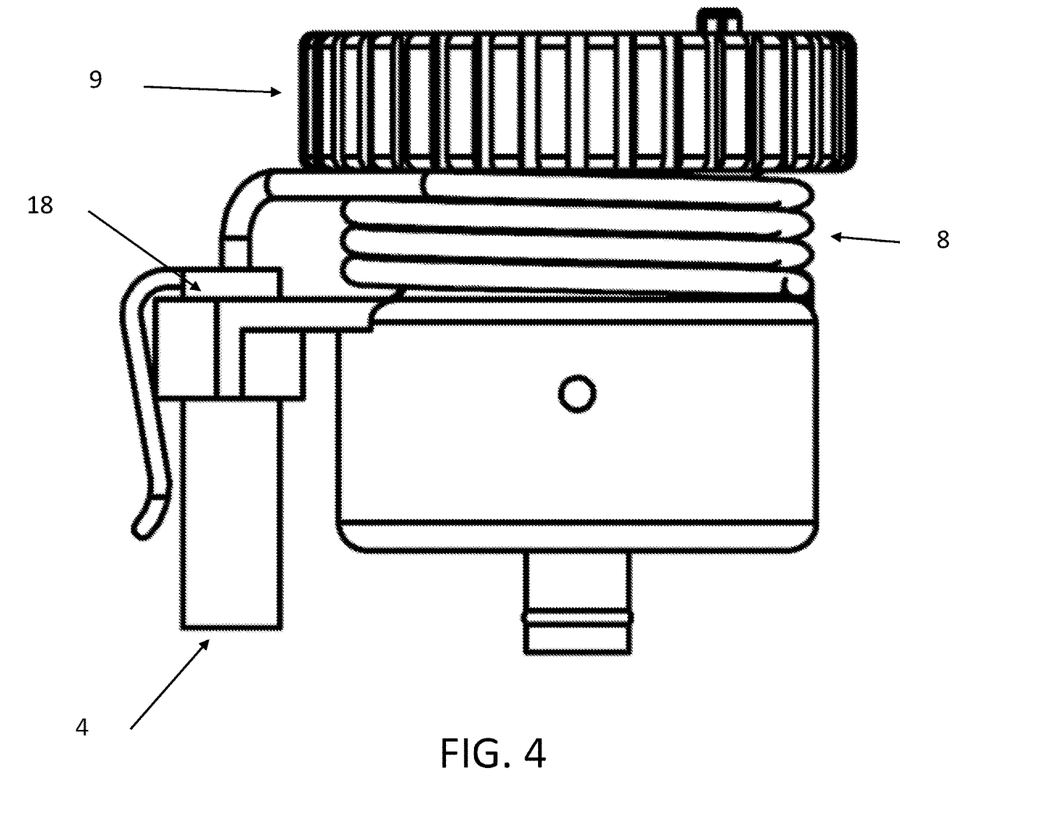
FIG. 4 is a side perspective view of an exemplary air conditioning output temperature measurement device in accordance with the invention.
Figure 5:
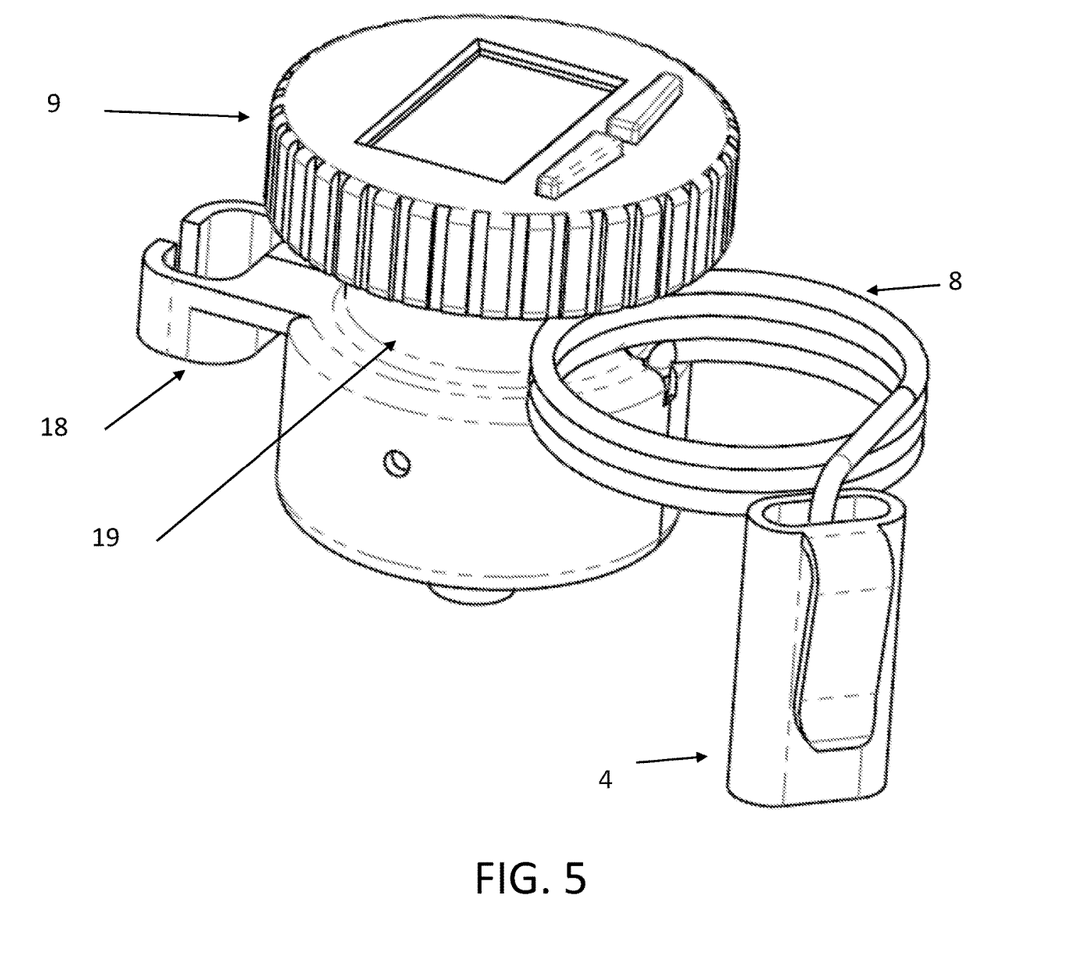
FIG. 5 is a perspective view of an exemplary air conditioning output temperature measurement device with the measuring gauge detached.

As shown in FIGS. 4 and 5, in the exemplary embodiment the temperature sensor 4 is in electrical communications with the air conditioning output temperature measurement device 100 via wire 8. The housing halves 1, 2 preferably includes a recessed portion 19 which allows for storage of wire 8 by easily winding wire 8 around the recessed portion 19 of housing halves 1, 2. The recessed portion 19 is preferably located below the display cap 9. In an alternate embodiment, wire 8 may be stored within the housing using a spring wound configuration. In another alternate embodiment, the housing includes a flip up lid with a compartment for storing temperature sensor 4. In another embodiment, the temperature sensor 4 includes any known wireless communication capabilities and communicates with the temperature measurement device 100 wirelessly.

In an exemplary embodiment, the temperature sensor 4 is preferably used at air conditioning vent inside the vehicle. Typical vehicles have lower and upper air conditioning vents on both the driver and passenger sides in the front cabin of the vehicle. Additionally, air conditioning vents are typically located near the front windshield for defrosting windows. In some vehicles, additional air conditioning vents are located in the rear cabin of the vehicle for passengers sitting in the rear seat. In an exemplary embodiment, the temperature sensor 4 is used to measure the temperature of the air output from the upper air conditioning vent in the front cabin. However, temperature sensor 4 may also be used at any other air conditioning vents in the vehicle.

An exemplary temperature sensor 4 in accordance with the invention measures the temperature of the air output through the vent. The temperature information is then sent either via wired or wireless communication to the coolant temperature measurement device 100 in use by a user located by the coolant port outside the vehicle. Temperature sensor 4 may include an optional clip for attachment to an air conditioning vent. Additionally, temperature sensor 4, optionally includes a timer adapted for turning off the power of the temperature sensor 4. For a wireless temperature sensor 4, an autotimer conserves battery power. As discussed earlier, temperature sensor 4 may also be a thermocouple thermometer which relays information via a wireless or wired connection to temperature measurement device 100.

When in use, the temperature sensor 4 constantly provides updates of the temperature at the air conditioning vent inside the vehicle to the temperature measurement device 100. In various embodiments, the temperature sensor 4 may provide updates in real-time, in predetermined intervals, or upon request by the user. As the user is filling coolant at the coolant port outside the vehicle, the display on the temperature measurement device 100 displays the reduction of the temperature at the air conditioning vent inside the vehicle based on the addition of refrigerant. When sufficient refrigerant has been supplied to the vehicle and the temperature of the output of the air conditioning vent inside the vehicle reaches an optimal temperature, the temperature measurement device 100 preferably provides an indication that the optimal temperature of the output of the air conditioning vent inside the vehicle has been reached. This indication may be in the form of a colored LED, an audible signal, or a digital display comparing the temperature output of the air conditioning vent inside the vehicle to an optimal temperature. In an exemplary embodiment, sufficiency may be determined by a preprogramed optimal temperature known to the temperature measurement device 100. In an alternate embodiment, user may have pre-existing knowledge of the optimal temperature for the air output at the air conditioning vent inside the vehicle and may manually determine when sufficient refrigerant has been filled. In such case, such knowledge exist from experience, vehicle manuals, or any other source which inform a user of an optimal temperature to indicate sufficiency of refrigerant.

Although the present invention includes an embodiment where only the temperature of air output at the air conditioning vent inside the vehicle is used to determine sufficieny of the refrigerant in the coolant system, the addition of an ambient temperature sensor increases the accuracy of the sufficiency of the refrigerant inside the vehicle coolant system. To ensure that a user optimally fills the vehicle with coolant, the temperature measurement device 100 preferably includes an ambient temperature sensor. The ambient temperature sensor relays to the display of the temperature measurement device to indicate the current ambient temperature. The temperature measurement device 100 preferably indicates to the user what the optimal air conditioning vent temperature should be based on the ambient temperature. The optimal air output at the air conditioning vent temperature may be a range of temperatures based on the ambient temperature.

Example 1: the ambient temperature sensor indicates that the current ambient temperature is 95 degrees Fahrenheit. With the air conditioner in the vehicle on the coldest setting, the temperature sensor 4 indicates that the temperature of air output at the air conditioner vent is 75 degrees Fahrenheit. The temperature measurement device 100, preferably includes memory and processing capability to calculate an optimal air output temperature relative to the ambient temperature. In this example, the optimal temperature would be 60 degrees Fahrenheit or may be a range from 55-60 degrees Fahrenheit. Based on this, the temperature measurement device 100 indicates that more refrigerant is needed.

Example 2: the ambient temperature sensor 4 indicates that the current ambient temperature is 75 degrees Fahrenheit. With the air conditioner in the vehicle on the coldest setting, the temperature sensor 4 indicates that the temperature of air output at the air conditioner vent is 65 degrees Fahrenheit. In this example, the optimal temperature would be 55 degrees Fahrenheit or may be a range from 50-55 degrees Fahrenheit.

In the exemplary embodiment, once the temperature measurement device 100 indicates to the user that either the known optimal temperature of the output of air at the air conditioning vent inside the vehicle has been reached or the optimal temperature relative to the ambient temperature has been reached, the user terminates filling of refrigerant at the vehicle coolant port.

Although it may be preferable for the temperature measurement device 100 to automatically notify a user when the optimal temperature of the output of the air conditioning vent inside the vehicle has been reached or when the optimal temperature relative to the ambient temperature has been reached, it is not necessary to do so in accordance with the current invention. A user may have preexisting knowledge of what the optimal temperature of the output of the air conditioning vent inside the vehicle should be for a sufficiently filled coolant system. Likewise, a user may also have preexisting knowledge of what the optimal temperature of the output of the air conditioning vent inside the vehicle should be for a sufficiently filled coolant system relative to the ambient temperature. In both cases, it is not necessary that any indicator must exist on the temperature measurement device 100, as a user may be able to determine from the visualization of the temperature(s) on the display when there is sufficient refrigerant in the vehicle coolant system and to terminate filling.

Figure 6:
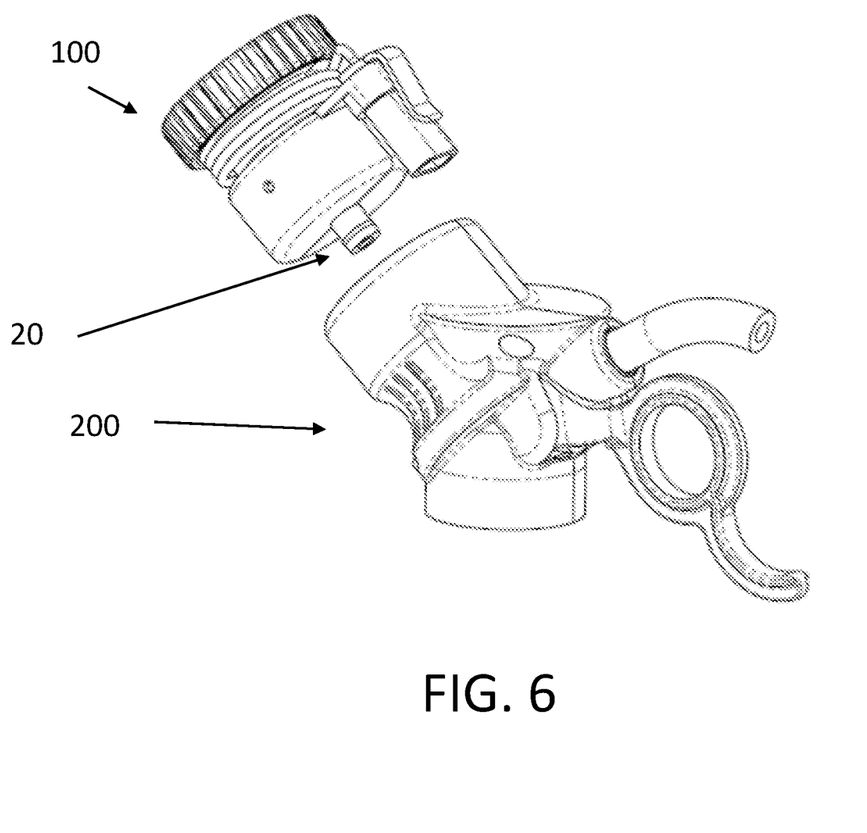
FIG. 6 is a perspective view of an air conditioning output temperature measurement device in operation with a bottle actuator.

FIG. 6 depicts the exemplary air conditioning output temperature measurement device in operation with a bottle actuator assembly. The housing preferably includes connector 20 for insertion into a bottle actuator assembly 200 having port for receiving connector 20. Although preferably attached to a bottle actuator assembly 200, it is not necessary for the coolant temperature measurement device to be physically adjoined to a bottle actuator assembly 200.

Figure 7:
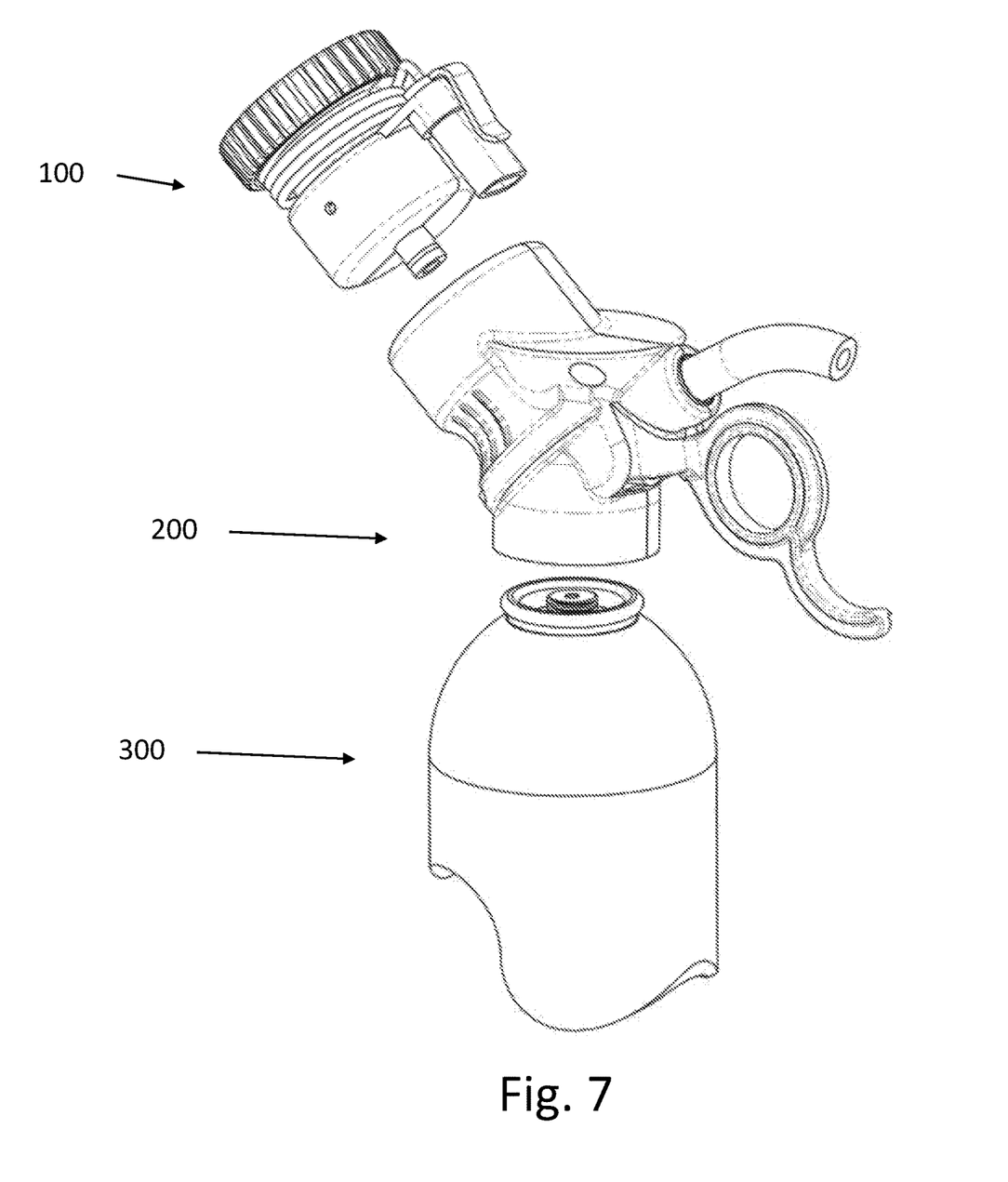
FIG. 7 is a perspective of an exemplary air conditioning output temperature measurement device in operation with a bottle actuator assembly device in accordance with the invention operating with a internal valve top bottle.

FIG. 7 further depicts the exemplary air conditioning output temperature measurement device 100 in operation with a bottle actuator assembly 200 in receipt of a pressurized bottle 300. The bottle actuator assembly 200 includes an actuation level when opening flow between the coolant system and the refrigerant bottle 300. A thorough discussion of this process is incorporated by reference from U.S. patent application Ser. No. 14/680,066.

These and other modifications to the above-described embodiments of the invention may be made without departing from the intended scope of the invention.

What is claimed is:

1. An apparatus for servicing a vehicle coolant system, the apparatus comprising:
a temperature sensor for measuring a temperature of air output at an air conditioning vent inside a vehicle; and
a coolant delivery device comprising:
a housing, having a first port that includes a connector configured for connection to a coolant source, and a second port having tubing configured to provide fluid communication between the housing and a coolant port of the vehicle coolant system;

a display, mounted on the housing, the display being in communication with the temperature sensor and providing the user with an indication of the sufficiency of refrigerant in the vehicle coolant system based on the temperature measured by the temperature sensor; and an actuator comprising an actuation lever positioned on the housing opposite the display, the actuation lever comprising a finger-receiving ring, the actuator being configured to allow a user to actuate delivery of coolant from the coolant source to the coolant port by the user actuating the actuation lever based on the information provided by the display;

wherein the temperature sensor is adapted for use inside the vehicle while the coolant delivery device is adapted for concurrent use outside the vehicle in fluid communication with the vehicle coolant system.

2. The apparatus of claim 1, wherein the temperature sensor is in wired communications with the display.

3. The apparatus of claim 1, wherein the temperature sensor is in wireless communications with the display.

4. The apparatus of claim 1, wherein the coolant delivery device further comprises a recessed portion for storing the temperature sensor.

5. The apparatus of claim 1, where in the temperature sensor further comprises an automatic timer adapted for turning off the temperature sensor.

6. The apparatus of claim 1, wherein the connector of the first port of the housing is configured for attachment to a bottle of coolant.

7. The apparatus of claim 1, wherein the temperature sensor further comprises a sensor housing having a clip for securely attaching to the vehicle air conditioner vent.

8. The apparatus of claim 1, further comprising a second temperature sensor in communication with the display for determining the ambient temperature outside the vehicle.

9. The apparatus of claim 8, wherein the display includes a comparison of the temperature of air output at the air conditioning vent inside the vehicle and the ambient temperature outside the vehicle.

10. The apparatus of claim 1, wherein the indication provided by the display is in the form of a colored LED, an audible signal, or a digital display indicating that a predetermined temperature at the air conditioning vent has been reached.

11. The apparatus of claim 1, wherein the indication provided by the display is in the form of a digital display showing the temperature measured by the sensor.

12. The apparatus of claim 1, wherein the coolant delivery device includes a bottle actuator assembly comprising the housing and actuator, and a second, separable portion, comprising the display.

13. The apparatus of claim 1, wherein the temperature sensor comprises a thermocouple thermometer.

14. The apparatus of claim 1, wherein the coolant delivery device further comprises a printed circuit board in electrical communication with the temperature sensor and the display.

* * * * *